US009120958B2

(12) United States Patent
Brizius

(10) Patent No.: US 9,120,958 B2
(45) Date of Patent: Sep. 1, 2015

(54) ULTRA-VIOLET CURABLE ADHESIVE

(75) Inventor: Glen Leon Brizius, Augusta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 84 days.

(21) Appl. No.: 13/816,988

(22) PCT Filed: Jul. 31, 2012

(86) PCT No.: PCT/US2012/048976
§ 371 (c)(1),
(2), (4) Date: Feb. 14, 2013

(87) PCT Pub. No.: WO2014/021842
PCT Pub. Date: Feb. 6, 2014

(65) Prior Publication Data
US 2014/0174650 A1 Jun. 26, 2014

(51) Int. Cl.
*C09J 151/02* (2006.01)
*C09J 197/00* (2006.01)
(52) U.S. Cl.
CPC ............ *C09J 197/005* (2013.01); *C09J 151/02* (2013.01)
(58) Field of Classification Search
CPC ............................ C09J 151/02; C09J 197/005
USPC ............................................. 525/54.4, 54.42
See application file for complete search history.

(56) References Cited

U.S. PATENT DOCUMENTS

| | | | |
|---|---|---|---|
| 4,279,788 A | 7/1981 | Lambuth | |
| 4,486,557 A | 12/1984 | Gaul et al. | |
| 4,608,111 A | 8/1986 | Hume, III et al. | |
| 5,455,349 A * | 10/1995 | Grasshoff et al. | 544/309 |
| 2002/0013462 A1 | 1/2002 | Gupta et al. | |
| 2005/0154199 A1 | 7/2005 | Whiteford et al. | |
| 2005/0178395 A1 | 8/2005 | Hunter et al. | |
| 2008/0031848 A1 | 2/2008 | Konradi et al. | |
| 2010/0028407 A1 | 2/2010 | Del Priore et al. | |
| 2012/0097194 A1 | 4/2012 | McDaniel et al. | |

OTHER PUBLICATIONS

Cellulose, http://web.archive.org/web/20120720110153/http://en.wikipedia.org/wiki/Cellulose, accessed Jul. 16, 2012, pp. 1-11.
Hemicellulose, http://en.wikipedia.org/wiki/Hemicellulose, accessed Feb. 9, 2014, pp. 1,2.
International Search Report and Written Opinion for PCT/US2012/048976 dated Oct. 9, 2012.
Black, Low-Emitting Green Adhesives Bring Improvement to Indoor Air Quality, Adhesives & Sealants Industry (May 1, 2009).
Biofuels Basics, Learning About Renewable Energy http://www.nrel.gov/learning/re_biofuels.html (Printed from Internet Jul. 27, 2012).
Compton, The Unimolar Tosylation[1] of alpha- and beta-Methyl-d-glucosides, *J. Am. Chem. Soc.* (Feb. 1938), 60(2):395-399 (Abstract).
Deepwater Horizon Oil Spill, http://en.wikipedia.org/wiki/Deepwater_Horizon_oil_spill (Printed from Internet Apr. 30, 2012).
Global Adhesive Market, http://answers.google.com/answers/thredview/id/60487.html (Printed from Internet Jan. 9, 2013).
Goodsell, The Molecular Perspective: Ultraviolet Light and Pyrimidine Dimers, *The Oncologist* (Jun. 2001), 6(3):298-299 (Abstract).
Haars et al., Room-Temperature Curing Adhesives Based on Lignin and Phenoloxidases, *ACS Symposium Series* (Dec. 31, 1989), 385:126-134 (Abstract).
Helfbrich et al., Ester de Methansulfonsäure in der Zuckergruppe, *Berichte der deutschen chemischen Gesellschaft (A and B Series)* (Jan. 27, 2006), 71(4):712-718 (Abstract).
Holladay et al., Top Value-Added Chemicals from Biomass, vol. II—Results of Screening for Potential Candidates from Biorefinery Lignin, Pacific Northwest National Laboratory, Prepared for the U.S. Department of Energy (Oct. 2007), pp. 1-79.
Kratochvil et al., Uracil Dimer: Potential Energy and Free Energy Surfaces. Ab Initio beyond Hartree-Fock and Empirical Potential Studies, *J. Phys. Chem. A.* (Aug. 6, 1998), 102(35):6921-6926 (Abstract).
Laser Focus World, http://www.laserfocusworld.com/whitepapers/2012/01/semrockinc.html (Printed from Internet Jan. 19, 2012).
Lieser et al., Zur Kenntnis der Kohlenhydrate V. Spezifitat der Zuckerhydroxyle, *Justus Liebigs Annalen der Chemie* (Jan. 24, 2006), 519(1):271-278 (Abstract).
Lignin Structure, http://en.wikipedia.org/wiki/File:Lignin_structure.svg (Printed from Internet Dec. 4, 2012).
Mizuno et al., Non-phosgene synthesis of benzyl chloroformate (CbzCl), *Tetrahedron Letters* (2002), 43:7765-7767.
Niggli et al., Cyclobutane-type pyrimidine photodimer formation and excision in human skin fibroblasts after irradiation with 313-nm ultraviolet light, *Biochemistry* (Mar. 1983), 22(6):1390-1395 (Abstract).
Oil-Price.net, Crude Oil and Commodity Prices, http://www.oil-price.net (Printed from Internet Apr. 30, 2012).
Perlack et al., Biomass as Feedstock for a Bioenergy and Bioproducts Industry: The Technical Feasibility of a Billion-Ton Annual Supply, Oak Ridge National Laboratory, prepare for the U.S. Department of Agriculture (Apr. 2005).
Pyrimidine dimers, http://en.wikipedia.org/wiki/Pyrimidine_dimers (Printed from Internet Jan. 9, 2013).

(Continued)

*Primary Examiner* — Robert Jones, Jr.
(74) *Attorney, Agent, or Firm* — Pepper Hamilton LLP

(57) ABSTRACT

An adhesive may be formulated with a functional component that reacts in the presence of ultraviolet light with a neighboring functional component to form a nonreversible bond therebetween. The functional component may include at least one —C=C— functional group that is able to undergo dimerization with a neighboring component. A method for making the adhesive includes covalently bonding the functional component to a support polymer, wherein the functional component may be covalently bonded to the support polymer by a linking molecule. A kit containing the adhesive and an ultraviolet light source is also provided.

17 Claims, 6 Drawing Sheets

(56) References Cited

OTHER PUBLICATIONS

Schwenker et al., Chemically Modifying Cellulose for Flame Resistence, *Ind. Eng. Chem.* (Jan. 1958), 50(1):91-96 (Abstract).

See the forest through the trees, Adhesives & "Green", http://www.cpadhesives.com/gree-adhesives (Printed from Internet Jan. 9, 2013).

Setlow, Cyclobutane-Type Pyrimidine Dimers in Polynucleotides, *Science* (Jul. 22, 1966), 153(3734):379-386 (Abstract).

Soy Inks and Adhesives: Cost Savings and Environmental Assurance, http://soynewuses.org/printing-inks-adhesives/ (Printed from Internet Jan. 9, 2013).

UV Bonding Adhesives, http://www.uvabcs.com/uvbonding-adhesives.php (Printed from Internet Jan. 9, 2013).

Volatile Organic Compounds, Health Effects Fact Sheet, Colorado Department of Public Health and Environment (Nov. 2000).

Volatile Organic Compounds, An Introduction to Indoor Air Quality (IAQ), http://www.epa.gov/iaq/voc.html (Printed from Internet Apr. 30, 2012).

Wolfrom et al., Advances in Carbohydrate Chemistry, vol. 8, Academic Press, Inc. (1953).

Wolfrom et al., Mesylated Cellulose and Derivatives[1], *J. Am. Chem. Soc.* (Jun. 1941), 63(6):1688-1691 (Abstract).

* cited by examiner

– XYLOSE – ß(1,4) - MANNOSE -ß(1,4) - GLUCOSE -
-ALPHA(1,3) - GALACTOSE

HEMICELLULOSE

ULTRA-VIOLET CURABLE ADHESIVE

CLAIM OF PRIORITY

This application is a U.S. national stage filing under 35 U.S.C. §371 of International Application No. PCT/US2012/48976, filed 31 Jul. 2012 entitled "Ultra-Violet Curable Adhesive," the disclosure of which is incorporated by reference in its entirety.

BACKGROUND

A steady supply of inexpensive, quality adhesives is important to modern society. Adhesives are used whenever two or more materials are designed to be joined by cohesion bonding and surface adhesion. Adhesives find their way into most, non-food consumer products. Major buyers include the bookbinding industry, companies who supply fabricated building materials such as processed wood for furniture and construction, and the textile/house wares industries. Some adhesives find specialized use in equipment construction and medical devices. The use of adhesives is essentially fundamental to the concept of "finished goods."

Many adhesives use petroleum-derived feedstock molecules such as formaldehyde, phenol and methylene diisocyanate. These chemicals can be volatile, easily escaping into the air, and may be harmful to human and animal health. Formaldehyde in particular has been classified as a carcinogen. Studies have linked volatile compounds from buildings and consumer products to several health problems such as sick building syndrome. Medical statistics show that about a quarter of the population of the United States may suffer from some malady (asthma, allergies, and other respiratory diseases) which may be at least in part aggravated by indoor pollution.

Such petroleum-based adhesives often require organic solvents or thinners for distribution. These solvents or thinners include methylene chloride, toluene, and/or trichloroethane, all of which may cause health risks. As the adhesive sets or cures, these solvents are given off as vapors in the form of volatile organic compounds (VOCs). VOCs are becoming of significant concern for both indoor air pollution and outdoor water supply pollution. Therefore, adhesives which are made from non-toxic components and which do not give off harmful vapors are desirable.

SUMMARY

Presently disclosed is an adhesive which includes naturally occurring materials and is curable with ultraviolet light, a kit which includes the adhesive, and methods for making and using the adhesive.

In an embodiment, an ultraviolet curable adhesive composition includes components of formula $R\text{-}(L\text{-}X)_n$, wherein n is greater than or equal to 1, R includes a macromolecular polymer, X includes a diazine having at least one unsubstituted —C=C— functional group, and L includes an aliphatic polyether.

In an additional embodiment, a method for producing an ultraviolet curable adhesive includes covalently bonding a plurality of diazines to macromolecular polymers derived from lignocellulosic biomass, wherein the covalently bonded diazines each have at least one unsubstituted —C=C— functional group.

In an additional embodiment, an ultraviolet curable adhesive composition includes components of formula $R\text{-}(L\text{-}X)_n$, wherein n is greater than or equal to 1, R includes a macromolecular polymer substantially transparent to ultraviolet light, X includes a heterocyclic aromatic compound having a functional group capable of photoinduced dimerization with a neighboring X component when exposed to ultraviolet light of an intensity sufficient for dimerization of the functional groups, and L includes a pliable linking component for covalently bonding X to R.

In an additional embodiment, an ultraviolet curable adhesive for adhering at least one first material to at least one second material, includes a plurality of diazines covalently bonded to polymeric supports, wherein each covalently bonded diazine has at least one diazine ring comprising at least one unsubstituted alkene.

In an additional embodiment, a method for adhering at least one first surface to at least one second surface with an ultraviolet light curable adhesive, includes placing the adhesive comprising components of formula: $R\text{-}(L\text{-}X)_n$ in contact with each of the at least one first surface and the at least one second surface, wherein n is greater than or equal to 1, R comprises a macromolecular polymer derived from biomass material, X comprises a heterocyclic aromatic compound comprising a —C=C— functional group capable of dimerization with a neighboring X components when exposed to ultraviolet light of a wavelength and an intensity sufficient for dimerization of the X components, and L comprises a pliable linking component for covalently bonding X to R. The method also includes exposing the adhesive to ultraviolet light of the wavelength and intensity sufficient to photoinduce dimerization between X components, and photoinducing dimerization between X components to bond neighboring X components to one another and adhere the at least one first surface to the at least one second surface.

In an additional embodiment, a method for producing an ultraviolet curable adhesive which has a diazine having a diazine ring with at least one unsubstituted —C=C—, includes covalently bonding a plurality of the diazines to a macromolecular polymeric support in a manner that leaves at least one unsubstituted —C=C— in each covalently bonded diazine ring.

In an additional embodiment, a kit for adhesively adhering at least one first surface to at least one second surface includes an adhesive and a light source. The adhesive has a composition of formula $R\text{-}(L\text{-}X)_n$, wherein n is greater than or equal to 1, R includes a macromolecular polymer derived from biomass material, X includes a heterocyclic aromatic compound comprising a —C=C— functional group capable of dimerization with a neighboring X component when exposed to ultraviolet light of a wavelength and an intensity sufficient for dimerization of the X components, and L includes a pliable linking component for covalently bonding X to R. The light source is for producing ultraviolet light having a wavelength of about 200 nm to about 400 nm for photoinducing dimerization between X components to bond neighboring X components to one another for adhering the at least one first surface to the at least one second surface.

DETAILED DESCRIPTION

Figure 1:
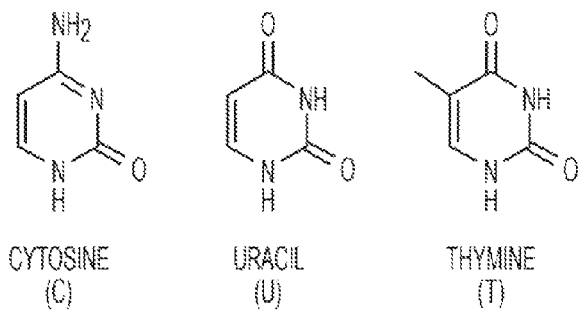
FIG. 1 depicts DNA and RNA pyrimidines Cytosine (C), Uracil (U), and Thymine (T), according to an embodiment.

The market for adhesives in the United States is soon expected to exceed 5 billion dollars. Over 50% of the non-electronic adhesives market is in paper and related areas. An alternative to petroleum-based adhesives can include adhesives that are either a thick oil or a paste in their natural state, making the adhesive easier to spread onto the surface to be adhered. The alternatives desirably do not "outgas" VOCs (non-solvent molecular fragments) upon curing. One alternative may include ultraviolet (UV) curable adhesives. UV curable adhesives may provide advantages in several areas. UV curable adhesives may fully cure in 5 to 20 seconds, which allows for increased production rates when compared to more traditional adhesives which may take more than an hour to set. UV curable adhesives may be "cured-on-demand" to allow component pieces to be accurately aligned before the curing process takes place. UV curable adhesives may also provide an economical but high quality, high strength bond.

A UV curing typically involves a photo-chemical reaction which converts a liquid or semi-liquid compound into a hard, plastic-like polymer. For most UV curable adhesives, which are essentially of two main types, epoxy (cationic) and acrylic (free radical), the basis of the process is a photo-initiator which absorbs light and then uses the absorbed light energy to initiate and propagate the curing reaction. Unlike conventional drying processes which use heat to evaporate water or solvents from a material, UV curing entails a conversion of liquid material to a solid state. This lack of solvents makes UV curing an attractive alternative in cases where solvent emission must be reduced. The hard plastic-like cured polymer usually has superior physical properties (abrasion resistance, gloss, and chemical resistance). These properties may be used effectively in many printing and industry applications. The UV curing process can be very fast, sometimes completed in fractions of a second, which may allow for increased production. The use of UV curable adhesives may also reduce space requirements, and, in addition, associated secondary drying operations may be eliminated.

UV-curable adhesives are useful in a large range of applications, including: the medical field (hearing aids, tubing connectors, angioplasty accessories, blood oxygenators, IV delivery systems, medical coatings, sensing devices, syringes); digital printing; optoelectronics (fiber optic components, optical data storage, digital projectors, compact camera modules, optical sensors and laser assemblies); electronic assembly (automobile electronics, cell phone camera assembly, encapsulation, disk drives, display panels, plasma displays, printed circuit boards, speakers, video tape recorder, wire tacking); and optics and general assembly (adhesives in manufacturing, lens bonding and coatings, ceramics, diamond assembly, stained glass).

Atom-economical curing reactions are rare, and may be found with an alternative type of UV curable adhesive which does not require a photo-initiator, and which involves a photochemically induced reaction between two adjacent alkenes to form a cyclobutane bridge (the photo-induced [2+2] cycloaddition of adjacent alkenes to form a four-membered ring). One example of such a reaction happens hundreds of times a second in our skin upon exposure to UV light from the sun or tanning booths when pyrimidine dimers are formed from thymine or cytosine bases in DNA via photochemical reactions.

Figure 2A:
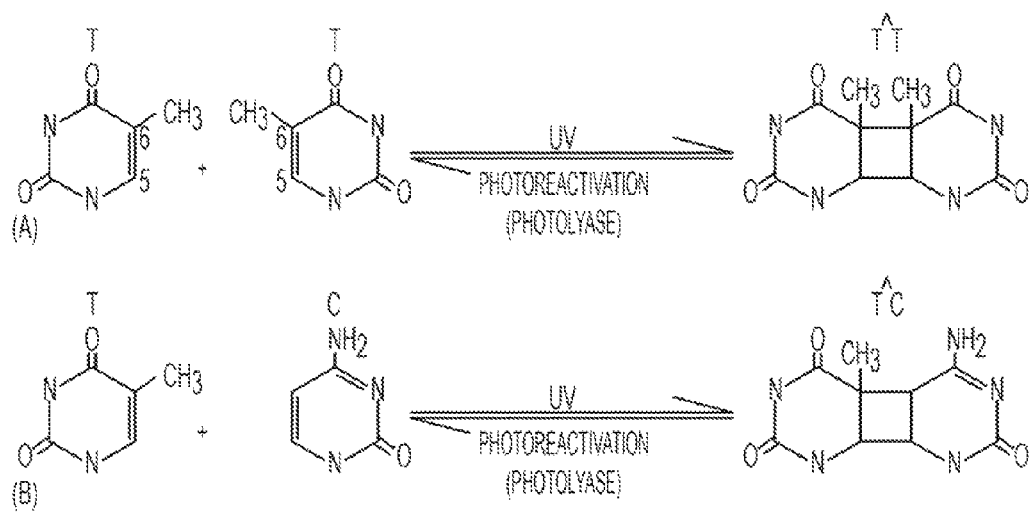
FIGS. 2A and 2B depict dimerizations of pyrimidines T and T, or T and C, according to an embodiment.
Figure 2B:
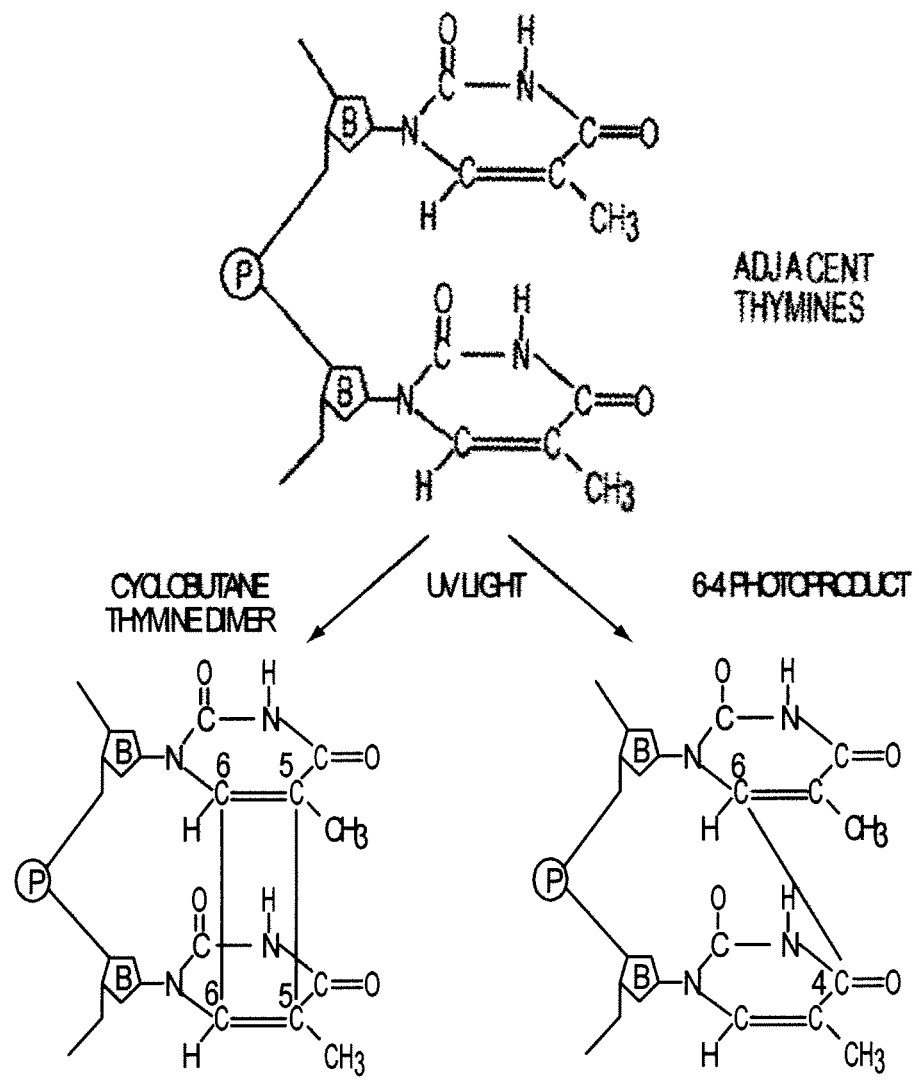

DNA and RNA are made up purine/pyrimidine pairs (guanine/cytosine and adenine/thymine for DNA) and (guanine/cytosine and adenine/uracil for RNA). When exposed to ultraviolet (UV) light, adjacent pyrimidines (cytosine, thymine, uracil, shown in FIG. 1) may form [2+2] cyclobutane pyrimidine dimers or (6, 4) photoproducts as shown in FIGS. 2A and 2B. The (6, 4) photoproducts occur about one third the frequency of the cyclobutane pyrimidine dimers. For [2+2] cycloadditions as shown in FIGS. 2A-2B, UV light is absorbed by electrons in the 5-6 double bond of a pyrimidine, destabilizing the bond, allowing a cyclobutane ring to form between two neighboring pyrimidines. This reaction is able to take place very rapidly upon exposure to UV light, and therefore is very common in skin cells where these molecules are prevalent. Each skin cell might experience 100 such reactions during every second of exposure to sunlight. Similarly, with the 6-4 dimerization, the 5-6 double bond is destabilized allowing a 6-carbon to bond with a neighboring 4-C of a —C=O group to form the resultant 6, 4 photoproduct.

In the body, most of the dimers may be repaired by photo-reactivation or nucleotide excision repair, but unrepaired dimers are mutagenic and the primary cause of melanomas in human beings. However, this same dimerization mechanism may be applied, in a benign fashion, for use as an adhesive. A neutral support molecule may be decorated with pyrimidine derivatives (or other similar compounds) and then "cured" by exposure to UV light, resulting in extensive cross-linking and a strong adhesive bond. Outside the body, the formed dimers are essentially stable, and once formed, may provide a strong adhesive bond for adhering at least two surface together.

Figure 3:
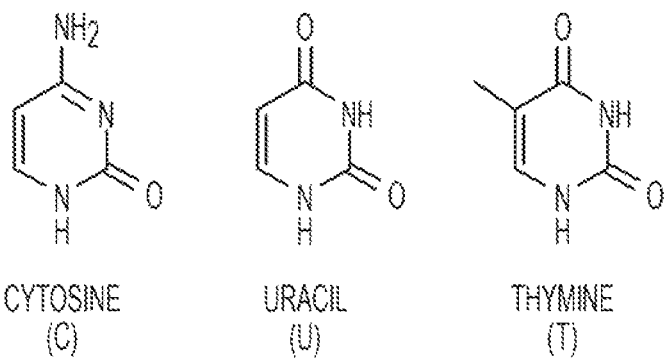
FIG. 3 depicts heterocyclic aromatic compounds having a —C=C— functional group, Cytosine (C), Uracil (U), Thymine (T), pyrimidine, pyrimidine derivatives, diazines (pyrazine, pyrimidine, and pyridazine), and a generic heterocyclic aromatic compound, according to embodiments.
Figure 3:
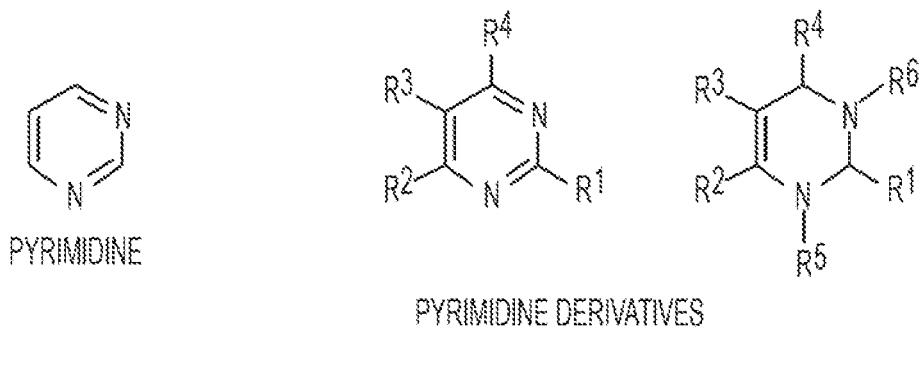
Figure 3:
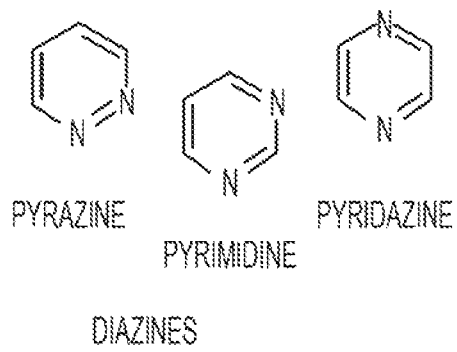
Figure 3:
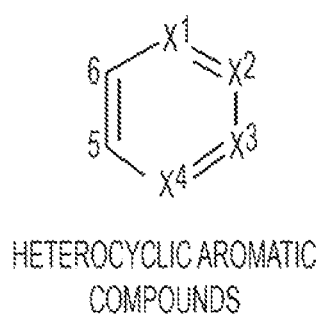

Adhesives may thus be formed from components which have a heterocyclic aromatic compound which have a functional group capable of dimerization with a neighboring component when exposed to ultraviolet light of an intensity sufficient for dimerization of the neighboring components. For an example dimerization with pyrimidines, the functional group is a —C=C— that is present in the aromatic ring. As shown in FIG. 3, cytosine, uracil and thymine are derivatives of pyrimidine. Pyrimidine, and derivatives of pyrimidine, having substituents $R^X$, may have the alkene —C=C— available for dimerization in the manner as discussed above. Similarly, as shown in FIG. 3, pyrimidines are of the broader group of compounds known as diazines, which also include pyrazine and pyridazine. Diazines, as well as derivatives of diazine (derivatives are not shown, but would be substituted in a manner as depicted for the pyrimidines), may also have the alkene —C=C— available for dimerization in the manner as discussed above.

With regard to the above-discusses compounds, "substituent" refers to a molecular group that replaces a hydrogen and may include but are not limited to trifluoromethyl, nitro, cyano, $C_1$-$C_{20}$ alkyl, aromatic or aryl, halide (F, Cl, Br, I), $C_1$-$C_{20}$ alkyl ether, $C_1$-$C_{20}$ alkyl ester, benzyl halide, benzyl ether, aromatic or aryl ether, hydroxy, alkoxy, amino, alkylamino (—NHR'), dialkylamino (—NR'R") or other groups which do not interfere with the formation of the diaryl alkylphosphonate.

Additional similar compounds include pyridine (monoazine) and triazine, and substituted derivatives thereof. The above-discussed compounds are all part of the broader grouping of heterocyclic aromatic compounds having a six-membered aromatic ring with at least one carbon atom replaced by a different element, which for the above-listed compounds is nitrogen. For six-membered aromatic rings, therefore, an alkene —C═C— may still be available for dimerization when up to four of the six atoms are of a different element X″ and located in adjacent positions as shown in FIG. 3. In general, compounds presenting a functional group having the ability to undergo dimerization with neighboring compounds when exposed to an ultraviolet light source may provide an adhesive bond within the context of the described technology.

By covalently bonding functional components having such UV-curable materials as discussed above, onto a support material, only a relatively few reactions between the bonded units may cure a large amount of material. A wide array of macromolecular polymers may provide a necessary support structure for the functional components if the polymers have available reactive sites for covalent attachment of the functional components thereto. However, with consideration for the current "green" movement, macromolecular polymers may be chosen so that an adhesive made therefrom is as environmentally friendly and safe as possible. Selection of a support may be made to thereby minimize the impact of chemical processes on the surroundings, while also striving to obtain chemical starting materials of interest from sources which are easily obtained and renewed, such as crops. Therefore, to reduce the environmental impact, the support material may be a material that is renewable, widely available and as inexpensive as possible.

Some examples of naturally occurring substances which may be usable as support polymers include, but are not limited to, cellulose, lignin, hemi-cellulose, chitin, dextran, starch, glycogen, pectin and inulin. Emerging technologies hold the promise of isolating cleaner, safer, and environmentally friendly chemical precursors from naturally growing grasses and plants. In general, grasses, residues from trees, and other agriculture waste can all theoretically be broken down into their component parts, cellulose, hemicellulose, and lignin.

Figure 4A:
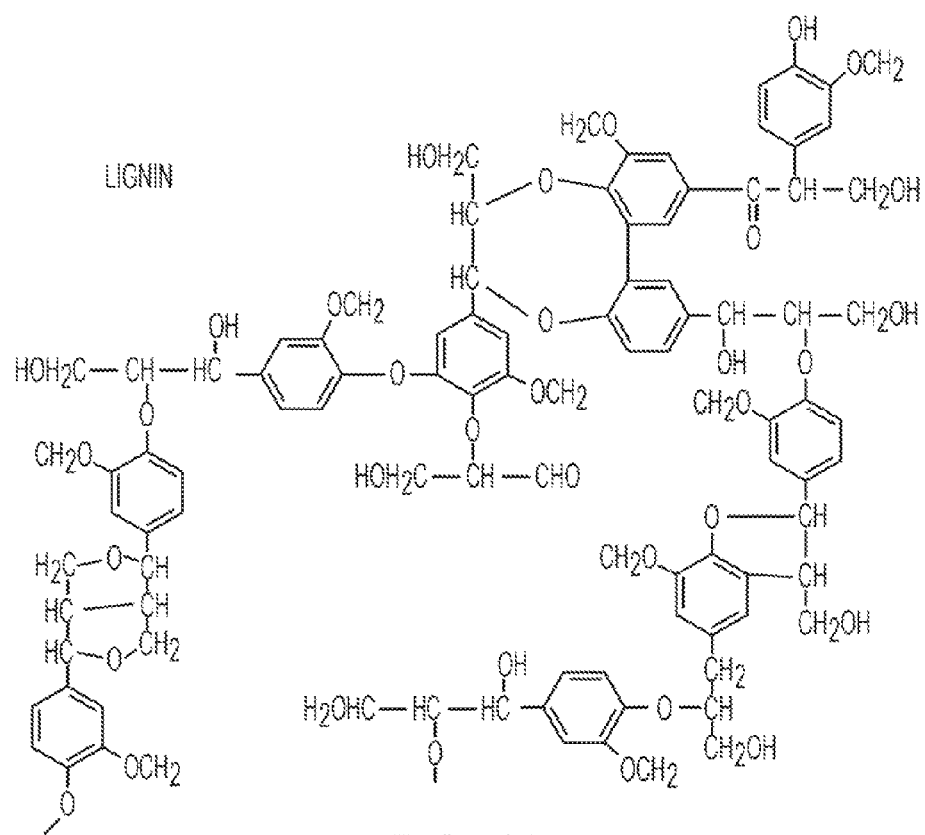
FIGS. 4A-4C provide general illustrations of the structures of lignin, cellulose and hemicellulose according to embodiments.

The biofuels industry is a rich provider of these biomass components, and is currently on an upswing due to rising costs of oil and an increased consumer demand for renewable, "clean", "green" fuel sources. Chemical refineries have sprung up that concentrate on using "biomass" as their choice of starting material; that is, any plant-based product such as corn, sugar cane, cassava, wood scraps, and so forth may serve as the fuel source for these "biorefineries," and like most factories, waste streams are produced as part of the cost of doing business. One of the primary waste products is a material called lignin. FIG. 4A illustrates a graphic representation of a typical segment of lignin. Lignin is a cross-linked, heavily aromatic, polymeric product that can be difficult to process and is currently viewed as having little value. Often, lignin is simply burned for fuel. Production of lignin is increasing to 1.3 billion tons per year, and since there is currently a low demand for lignin, lignin remains relatively inexpensive. By using the lignin waste stream from the rising bio-refinery industry in such a way that it is transformed into a valuable material, an otherwise waste product is transformed into a valuable commodity. This would offer the bio-fuels industry a useful and inexpensive way to utilize a waste product from their ethanol production to make a useful material.

Figure 4B:
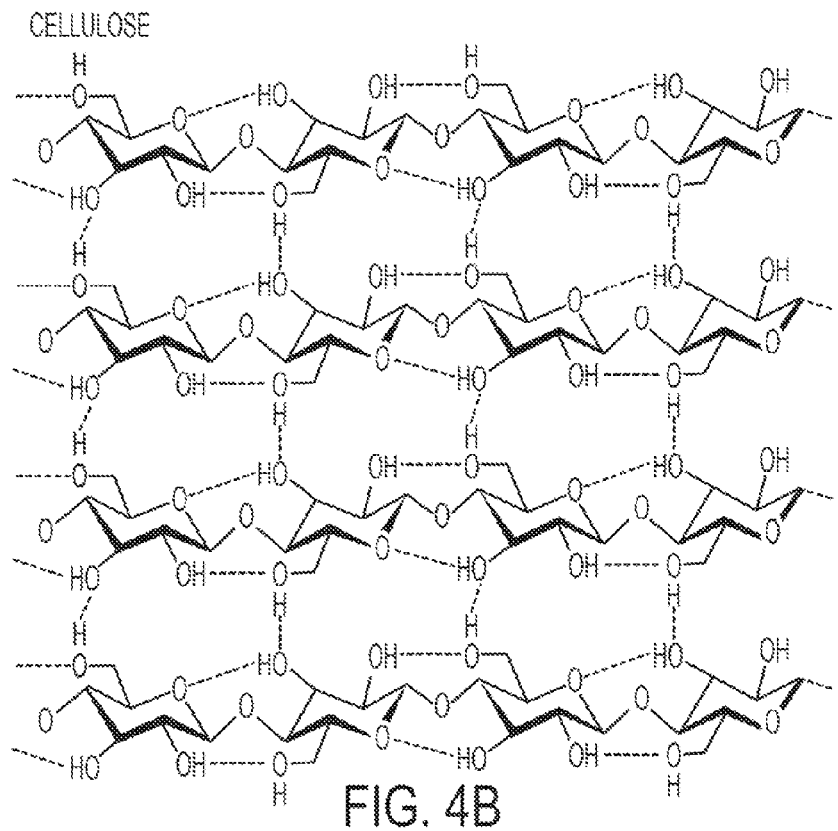
Figure 4C:
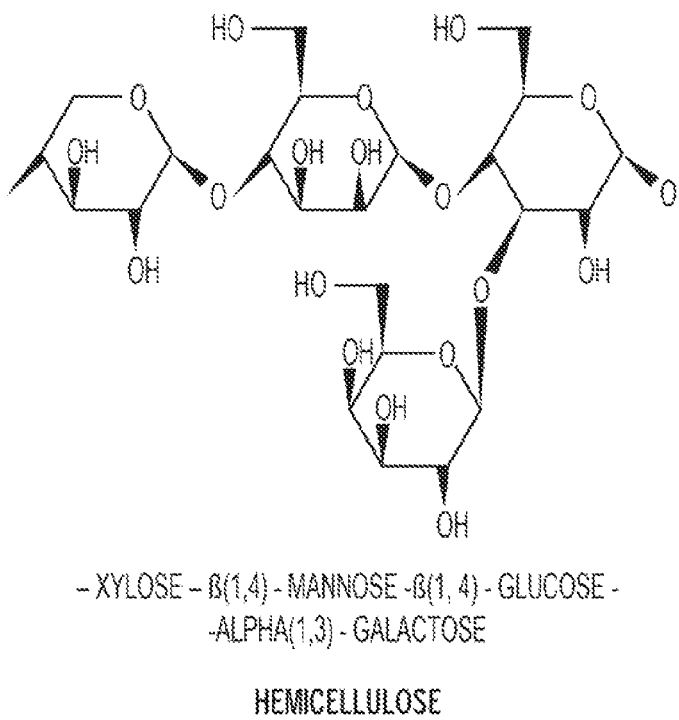

As depicted in FIG. 4A, lignin is rich with phenols and primary/secondary alcohols, all of which may theoretically be used as a chemical attachment points for covalently bonding a UV curable functional group thereto. In addition to lignin, other biomass materials widely available from crops and trees, and which may be usable as support polymers include cellulose and hemicellulose (the structures of which are shown in FIGS. 4B and 4C), and any derivatives of lignins, cellulose and hemi-cellulose. While cellulose and hemi-cellulose may not be as inexpensive as lignin due to their usefulness in other processes, they are widely available and relatively inexpensive. Like lignin, cellulose and hemi-cellulose possess a large number of hydroxyl groups, and so similar chemistry used for the decoration of lignin could be used to covalently attach ligands of interest to cellulose and hemicellulose. Because cellulose (in particular) contains strong intramolecular hydrogen bonding, the cellulose matrix may first be loosened by soaking the cellulose in a chemical solvent, otherwise, the process is essentially the same for all three materials.

In view of the above, one relatively inexpensive and environmentally friendly embodiment of an adhesive gel or paste that may be cured with exposure to UV light, may include a lignin, hemicellulose, and/or cellulose support with covalently attached pyrimidine residues. The covalent attachment may be by means of an additional molecular species linking chain, such as polyethylene glycols for example, wherein the length of the chain is able to alter the texture or consistency of the unexposed adhesive from an oil to a waxy solid. For such an embodiment, when exposed to UV light containing a wavelength of at approximately 313 nm (or light within a range of from about 250 nm to about 365 nm), the compound is able to form strong covalent bonds with adjacent pyrimidine residues on adjacent support molecules via a rapid photochemical[2+2] cycloaddition or 6-4 dimerization. The UV exposure transforms the oily/waxy monomer into a strong, solid adhesive, and no toxic molecular byproducts will be formed or released (VOCs, etc). Such an embodiment of an adhesive is a simple to synthesize UV-curable adhesive made almost entirely from inexpensive, naturally occurring renewable resources.

Typical UV-curable adhesive require many components, such as a polymerizable section and a photoinitiator. A UV curable adhesive in accordance with embodiments of the described technology may be less complex as the adhesive may generally involve a UV curable functional component covalently bonded to a macromolecular polymer.

As discussed previously, the macromolecular polymer may be at least one of cellulose, lignin, hemi-cellulose, chitin, dextran, starch, glycogen, pectin, inulin, and derivatives thereof and combinations thereof. This list is not meant to be limiting to only the polymers listed, as the listed polymers are examples only of possible polymers which may be used. The macromolecular polymer may be a polymer derived from biomass, which may be lignocellulosic biomass, and the polymer derived from lignocellulosic biomass may be at least one of cellulose, lignin, hemi-cellulose, and derivatives thereof and combinations thereof.

In addition, the shortest linking species may be a covalent bond, or the linking species may be a substantially linear molecular constituent for conferring a desired degree of pliability to the adhesive. The substantially linear molecular constituent has a length, and the length provides a correlated degree of pliability to the cured adhesive, with longer length providing increased pliability to the cured adhesive. The length of the linking component may also provide for variable consistency in the uncured adhesive, with shorter lengths providing for an oil-like consistency, and longer lengths providing for a waxy consistency. The linking constituent may include at least one of substituted or unsubstituted linear alkyls, substituted or unsubstituted linear alkenyls, and substituted or unsubstituted linear polyethers. In an embodiment, the linking components may include aliphatic polyethers. In a further embodiment, the linking component may include at least one of polyoxymethylene ($—[CH_2O]_m—$), polyoxymethylene ($—[CH_2CH_2O]_m—$), polyoxypropylene ($—[CH_2CH_2CH_2O]_m—$), polytetrahydrofuran ($—[CH_2CH_2CH_2CH_2O]_m$), wherein m is greater than or equal to 1, and derivatives thereof and combinations thereof. This list is not meant to limit the described technology to only the linking components listed, as the listed components are examples only of possible components which may be used.

In addition, the UV curable functional component may be a compound comprising a functional group capable of dimerization with a neighboring compound when exposed to ultraviolet light of an intensity sufficient for dimerization of the functional groups. The functional group may be an alkene functional group, or —C=C—. The compound may be a heterocyclic compound with at least one —C=C—, and the compound may be pyridine or a diazine, or derivatives thereof, or combinations thereof. In an embodiment, the functional component may be at least one of pyrazine, pyrimidine, pyridazine, and derivatives thereof and combinations thereof. In a further embodiment, the functional component may be at least one of thymine, uracil, cytosine, and derivatives thereof and combinations thereof. This list is not meant to limit the described technology to only the functional components listed, as the listed components are examples only of possible components which may be used.

Figure 5:
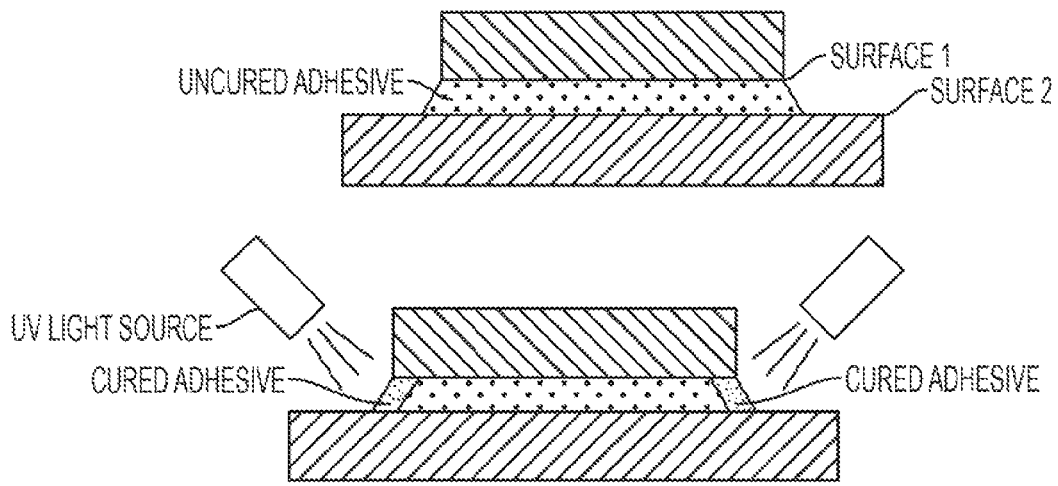
FIG. 5 depicts an ultraviolet curing of an adhesive according to an embodiment.

As shown in FIG. 5, a formulation of adhesive in accordance with embodiments presented herein may be placed between two surfaces which are to be bonded together, and the adhesive may be cured by exposure to a UV light containing a wavelength of approximately 313 nm (or light within a range of from about 250 nm to about 365 nm). Upon exposure, the functional components may form nonreversible dimeric bonds, as demonstrated in FIG. 2, or in the uracil examples below and in FIG. 6. And, once cured, the surfaces may be bonded together. The exact choice of wavelength for the UV light may depend on the product. Wavelengths in the 250 nm range (UVC) may be associated with surface cure, and wavelengths between 320 and 365 nm (UVB and UVA) may penetrate deeper (as they are often less well absorbed by the organic components at the surface), which may improve the depth of the cure.

Within the general concept of the described technology, an adhesive may be formed by preparing macromolecular polymers to have a linking molecular species (long or short chains) terminated with the UV curable functional groups. A short period of irradiation with a UV light source may "set" the adhesive, forming a strong permanent bond. For spot curing, high pressure mercury lamps may be used. A 100 watt lamp may be capable of generating a high output (exceeding 16 Watts/cm$^2$) in the focal point of the adhesive spot being cured. Alternatively, arc electrode lamps (200 watts) may generate 30 Watts/cm$^2$ in situations where high output curing may be needed. These lamps may typically provide over 3000 hours of use.

Other choices of light may include high power optical fiber light guides, liquid light guides, "light lines", and cure rings. The optical fiber light guides are fairly durable and have the advantage of being easy to customize. Liquid light guides tend to degrade over time but they are economical and also offer high transmission capability. "Light lines" offer a uniform line between 25 and 130 mm and are commonly used for LCD sealing, digital printing, and fiber array bonding. "Light lines" may also be available in both standard and high power fiber versions. Cure rings may provide 360 degree uniform light distribution (with typical inner diameter of 10 mm). Cure rings may typically be used for radial bonding, such as for curing the outer diameter of disposable catheters or tube sets. The resulting cured adhesive would be strong due to its extensive crosslinking but it may also be designed to be flexible, if desired as a function of the linking molecules.

As discussed previously, one embodiment of such an adhesive may be, for example, a derivatized lignin, cellulose, or hemicellulose support, with long or short chain polyethylene glycols terminated with pyrimidine derivatives, which may be alkylated or even contain sugar groups, which may add to the adhesive power of the adhesive due to additional hydrogen bonding. In an embodiment, the variable length of the PEG groups may allow them to act as internal plasticizers. The material would not be toxic as lignin/cellulose/hemicellulose+PEG groups+pyrimidines are the only components in the adhesive. In addition, no VOCs would be evolved during the adhesive curing as all the atoms are used in the process and no fragments are given off.

An adhesive, in accordance with an embodiment, may be made by covalently bonding a plurality of functional components to macromolecular polymer support molecules, wherein the functional components have a functional group capable of photoinduced dimerization with the functional group of a neighboring components when exposed to ultraviolet light of an intensity sufficient for dimerization of the functional group. The functional components may be covalently bonded to the polymers in a manner that leaves at least one —C=C— in each covalently bonded functional component.

Covalently bonding the functional component to the polymer may include first covalently bonding a plurality of linking components to the polymeric support, wherein the linking components may be configured for conferring a desired degree of pliability to the adhesive, and covalently bonding the functional components to the linking components.

In embodiments, the polymeric support molecules, the linking components, and the functional components may be any of the previously mentioned components, either taken single, or in combination with others of the previously mentioned components. Any one, or combination of polymeric supports, may be used in combination with any one, or combination of linking components, which may be used with any one, or combination of functional components.

Figure 6:
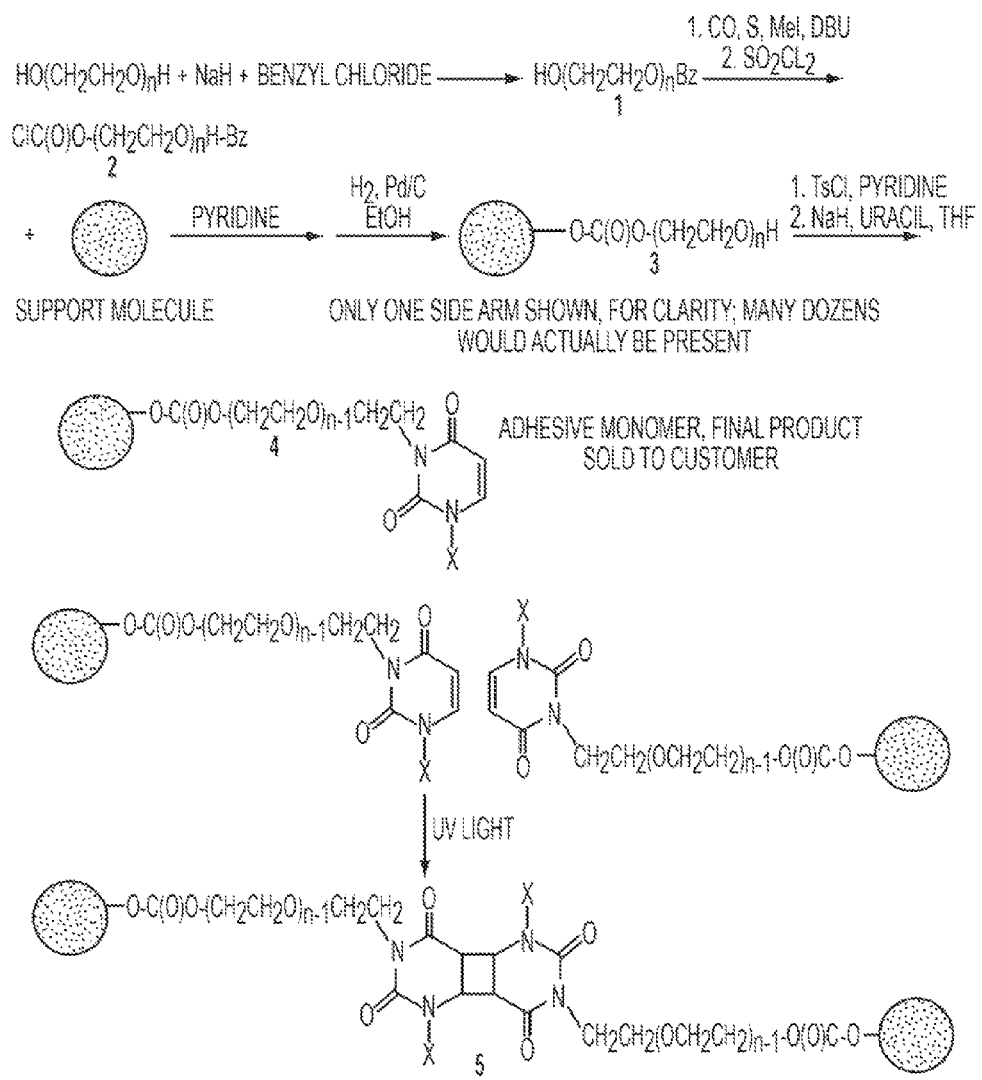
FIG. 6 depicts a method of making and curing an adhesive according to an embodiment.

An exemplary synthesis is depicted in FIG. 6, with polyethylene glycol (PEG) as the linking component and uracil as the functional component. "X" in the figure may be a hydrogen (from naturally occurring uracil), or it may alternatively be any substituent group as previously provided. Different substituent groups may add different functionalities to the adhesive. For example, biocidal or antifungal/antirot agents such as quaternary amine salts or phenols may be attached, which would help to preserve the adhesive. The amine hydrogen between the two carbonyls will typically be the most acidic and also the first to be deprotonated by the NaH. Substitution should therefore occur at this site, although substitution at the other nitrogen (if bare) would not affect the usability of the product. The "n" subscript after the PEG segment signifies that the chain can be a variety of lengths. Increasing the PEG chain length will change the physical properties of the adhesive going from oily to waxy to brittle/crystalline. Resultant consistencies for achieving a desired final product may be experimentally determined by varying the number of PEG repeat units. While the synthesis is discussed with uracil and PEG, the procedure may be applicable to others of the components and combinations as previously set forth.

As depicted in FIG. 6, a first step in the synthesis may be substituting one side of the PEG group with a benzyl ether to produce the compound 1. The terminal alcohol of the PEG chain may then be transformed into a chloroformate group by reaction with carbon monoxide (CO), sulphur, diazabicycloundecene (DBU), methyl iodide (MeI), and sulfuryl chloride ($SO_2Cl_2$) to give compound 2.

An example of a synthesis of benzyl chloroformates, such as compound 2, may be done by the combination of the carbonylation of benzyl alcohol with carbon monoxide and sulfur or carbonyl sulfide in the presence of DBU (1,8-diazabicyclo [5.4.0]undec-7-ene), and the chlorination of formed S-methyl O-benzyl carbonothioate using sulfuryl chloride. Benzyl alcohol may be reacted with carbon monoxide and sulfur at about 1.0 MPa, and about 80° C. for about 6 h in the presence of DBU in THF. The resulting carbonothioate salt in THF solution may be esterified by methyl iodide under an ambient pressure, at about 20° C. for about 16 hours. Pressures of up to about 3.0 MPa, with sulfur (3.0 equiv.) and DBU (5.0 equiv) may be used. While alternatively, somewhat milder conditions may also be used and a carbonylation reaction may be performed at a pressure of about 1.0 MPa, with sulfur (1.5 equiv.) and DBU (1.5 equiv). The reaction conditions may vary depending on the substrates used, and essentially optimal conditions may be determined experimentally.

Carbonyl sulfide may provide an effective reagent for the carbonylation reaction. The carbonylation of benzyl alcohol with carbonyl sulfide may be done under an ambient pressure and at about 20° C. for about 1 hour in the presence of DBU in THF. The formed carbonothioate salt may be quenched by methyl iodide at about 0° C., and the resulting mixture may be stirred under an ambient pressure, at about 20° C. for an additional about 2 hours to provide S-methyl O-benzyl carbonothioate at a yield of about 87%. Next, the chlorination of S-methyl O-benzyl carbonothioate by sulfuryl chloride may be done by the slow addition of sulfuryl chloride to the S-methyl O-benzyl carbonothioate at about 0° C. with vigorous stirring at about 20° C. for about 1 hour to provide the benzyl chloroformate in a quantitative yield and in an almost pure form. Additional purification may be done by vacuum distillation.

This acid chloride may then be used to functionalize the cellulose/lignin/hemicellulose to produce the compound 3.

While the lignin and/or hemicellulose may be directly functionalized by treatment with the acid chloride in pyridine, the cellulose must first be soaked and swollen in order to facilitate functionalization. Normally the hydroxyl groups on the cellulose form a tight network of hydrogen bonds—a maze of tight tendrils that is difficult to penetrate. Swelling the fibers allows the tendrils to temporarily relax, providing access to the interior of the tendril and allowing for complete functionalization. This process may be accomplished by submerging the cellulose in a low concentration NaOH(aq) solution at room temperature for 15 minutes. This mild, low concentration method does not dissolve the cellulose or appreciably deprotonate the hydroxyl groups, but rather serves to temporarily loosen the hydrogen bonding between cellulose strands by presenting additional (more heavily charged) oxygen atoms into the matrix. The cellulose may then be washed free of excess NaOH with a dilute acetic acid wash followed by a water wash until the washings are pH neutral. Excess liquid may be removed by wringing/pressing and the cellulose may then be suspended in pyridine which replaces much of the water that is present.

A completely anhydrous system is not necessary for the next synthetic step, as it has been found that a small amount of water is acceptable and even desirable, even though the hydroxyl groups in the water may react preferentially over the cellulose. The wet pyridine (which may later be dried for recycling and/or reuse) of a cellulose/pyridine mixture may then be replaced with fresh pyridine and the acid chloride compound 2 may be added to the container with stirring. It has been determined that it is almost exclusively the primary alcohols on the cellulose strands which react under these types of conditions. The reaction may be continued for about one hour at about 50° C., (a mild temperature which has been determined to give an appreciable completion of reaction for the similar mesylation reaction). The cellulose may then be removed from the pyridine bath, rinsed extensively under fresh water to remove the impurities (which are water-soluble pyridine salts) before finally drying in open air overnight to give a product with the same high strength as the starting material and which is stable to washing.

The other two supports, hemicellulose and lignin, may be directly reacted with the acid chloride in pyridine. A generic sphere graphic is used in FIG. 6 to represent the support material. For the purposes of this discussion, the length of the PEG chain between the support and the pyrimidine derivative doesn't matter, except to determine the final state of the adhesive monomer, wherein shorter PEG chains would make the product an oil, while longer PEG chains would produce a waxy solid monomer. Likewise, it does not matter where on the support the PEG chains end up, as all oxygen substitutions are equally acceptable. This tailorability may provide for a wide family of possible compounds.

Product 3 may be dissolved in dry pyridine at room temperature under a blanket of inert gas, with stirring. About 1.0 equivalents (per terminal PEG hydroxyl group) of toluene sulfonyl chloride may be added portion-wise, with cooling as necessary to keep the internal flask temperature between about 0° C. and about 25° C. After about 4 to about 8 hours of stirring, the flask may be poured into equal volumes of dilute (0.1M) HCl and a solvent, such as, for example, ethyl acetate or dichloromethane, for the intermediate tosylate. The aqueous layer may be extracted (at least one time, but may be more for improved results) with fresh volumes of organic solvent. The organic layers may be combined and dried over anhydrous $MgSO_4$ before removing the volatile solvents in vacuo to give the crude tosylate, which is used without further purification. A freshly dried reaction flask equipped with stirring may be filled with an appropriate amount of freshly dried THF under a blanket of inert gas with a mineral oil bubbler as a gas outlet. To this may be added about 1.0 equivalents (as vs. the # of tosylate equivalents) of uracil. NaH (1.0 equivalents as vs. the # of uracil equivalents) may be added portion-wise with ice-water cooling to keep the internal flask temperature between about 0° C. and about 25° C. Once the NaH has been added, the flask may be stirred for an additional about 20 to about 30 minutes at this lowered temperature and then the tosylate intermediate may be added portionwise, maintaining inert atmosphere, over about 15 to about 30 minutes. Stirring and temperature control is continued for another about 4 to about 8 hours. The reaction may be quenched with the addition of saturated ammonium chloride solution. The organic layer may be dried over anhydrous magnesium sulfate and the volatiles may be removed in vacuo to give the uracil-terminated product 4.

A mixture of uracil/cytosine/thymine may all be used, or they may be used solo as shown. Such a "mix and match approach" along with varying the total amount of coverage of the pyrimidine bases on the different supports may give rise to a large number of viable adhesives. When it comes to degree of coverage, a lower percentage of coverage of pyrimidines, of less than about 20%, for example, may provide a relatively weak adhesive (which may be desirable for some uses), whereas a more comprehensive decoration of the support, of at least about 30%, and up to persubstitution, would result in stronger and stronger adhesive strengths. The strength of the adhesive may be specifically tailored to meet customer requirements.

The result can be a 3-dimensional network of interlocked support molecules, extensively cross-linked by the formed cyclobutane and/or 6,4 dimerization products. The overall structure should be quite strong, and should not only takes advantage of the natural intramolecular hydrogen bonding and π-π aromatic interactions (in the case of lignin) but the adhesive will also be linked via multiple covalent bonds from the photochemistry. Standard adhesive tests may be used to test the effectiveness of the adhesive, including (depending on the end use of the adhesive): PAT (Pin adhesion test), ECT (Edge Crush Test), BCT (box crush test), as well as the more standard tests: tension, compression, 90 degree, 180 degree, T peel adhesion, release force tests, loop tack measurements, shear, flexural, high and low temperature chambers to test adhesives under real life conditions. All of these tests may be performed using industry standard testing equipment which has strictly standardized testing procedures.

The choice of the support material may provide a facet of the adhesive. To minimize possible unwanted absorption of UV light by the support, the material may be UV transparent. While lignin is less UV transparent than hemicellulose or cellulose, lignin may provide a more viable support when the adhesive needs only a surface cure as lignin provides a cost advantage over cellulose and hemicellulose. While the carbonyl groups of the pyrimidine side arms will also absorb UV light, it is in competition with the pyrimidines which should have a higher absorption coefficient and in any case, the competing groups should be present in only a 1:1 ratio with the sidearms. There should be extensive absorption by the pyrimidine residues, which will lead to extensive crosslinking between units of the support. The supports may also act as bulking agents (meaning that the formation of even just one crosslink drags with it thousands of strong covalent bonds), and the supports may also lend their hydrogen bonding network to the finished adhesive (which increases the adhesive strength, when compared to the crosslinks alone).

Once the monomer has been produced, about 0.1% (by weight) of sodium or potassium benzoate, or other types of preservatives, may optionally be added to act as a preservative and to protect against mold and rot.

Overall, embodiments of an adhesive according to the disclosed technology may offer fast cure speed with good, resistant adhesive strength. There may be only moderate shrinkage with deeper cure depth and they are simple to use, being applicable to almost all surfaces, plastic, wood, metal, ceramic, glass, etc. The usable temperature of these adhesives may be in line with other acrylic (free radical initialized) adhesives: approximately −40° C. to about 100° C. The pre-irradiated adhesive may be expected to have a long shelf-life, similar to many other adhesives on the market. However, instead of using petroleum feedstocks and organic solvents (which outgas VOCs during cure), this technology uses renewable, biodegradable feedstock and uses no solvent at all, making it much more environmentally friendly without compromising strength of adhesion or raising the cost.

EXAMPLE 1

Adhesive Formulation

A UV curable adhesive having an 'oily' texture will have uracil as the functional component, lignin as the support polymer, and short chain PEGs, between about 5 to about 10 PEG groups, as the linking components. The lignin will have at least about 50% uracil substitutions to provide a relatively strong adhesive bond.

EXAMPLE 2

Method for Making a UV Curable Adhesive

A uracil-based adhesive, such as that of Example 1, and following the representation of FIG. 6, will be made by first substituting one side of the PEG group with a benzyl ether. For this reaction, into a flame-dried 50 ml two-neck round-bottom flask (equipped with mineral oil bubbler) will be added 3.26 g (0.01 mol) of $HO(CH_2CH_2O)_7H$. Freshly dried THF (25 ml) will be added under a blanket of inert gas such as dry nitrogen. The flask will be cooled to 0° C. (exterior ice bath) while keeping slightly positive nitrogen pressure. Stirring will be initiated and 240 mg (1 eq, 0.01 mol) of sodium hydride will be added portion-wise over 60 minutes, maintaining inert atmosphere and temperature control. After an additional 30 minute stir, 1.10 mL (1.21 g, 1.0 eq, 0.01 mol) of benzyl chloride will be added via syringe.

The stirred contents will be allowed to warm to room temperature and the reaction will be quenched by the addition of several drops of water. Solvents will then be removed under vacuum. Ethyl acetate (approx 10 mL) will be added to the residue and filtered through filter paper or a cotton plug. Solvents will again be removed under vacuum to give a benzyl ether protected PEG chain (product 1 in FIG. 6).

The benzyl ether protected PEG chain will be dissolved in 25 ml of THF and added to an appropriately sized high-pressure steel reaction container (such as a "Parr-type" bomb apparatus) equipped with stirring. Powdered sulfur (480 mg, 0.015 mol) and DBU (2.28 g, 0.015 mol) will be added. The container will be sealed and flushed several times with carbon monoxide. The vessel will then be heated to 80° C. and pressurized to 1 MPa (approximately 145 psi) with carbon monoxide, with stirring. This temperature/pressure combination will be maintained for 6 hours. The container will then be allowed to cool to room temperature and the pressure will be carefully vented. The contents of the vessel will then be transferred to a 50 mL round-bottom flask equipped with a stirbar. A few milliliters of fresh THF will be used to wash out the reaction vessel, and the extra THF will be transferred to the bulk of the reaction mass in the round-bottom flask.

Methyl iodide (0.63 mL, 1.43 g, 0.010 mol) will then be added (at 20° C.) via syringe to the THF solution. The flask will be stoppered and allowed to stir at ambient temperature/pressure for 16 hours. Afterwards, removal of solvent under vacuum will give the intermediate S-methyl-O-PEG carbonthioate intermediate in 90%+ yield. To this neat crude product (in a dry 25 mL round-bottom flask) will be added at 0° C. a slow (5-10 minutes) addition of $SO_2Cl_2$ (0.81 mL, 1.35 g, 0.010 mol). The temperature will be allowed to rise to 20° C. with vigorous stirring for one hour to give the desired chloroformate (product 2) in sufficient purity. The chloroformate will be temporarily stored under inert gas.

One gram of lignin will be dissolved/slurried in 25-50 mL of dry pyridine in a 100 mL round-bottom flask. To this will be added 2 grams of the chloroformate material at 25° C. The flask will then be gently heated to 50° C. for 1 hour before cooling. Any precipitated pyridinium salts will be filtered and the liquid phase will be added to equal volumes of ethyl acetate and water. The organic phase will be separated and the aqueous phase will be extracted three more times with fresh ethyl acetate. The combined organics will be dried over anhydrous magnesium sulfate, filtered through a cotton plug, and the solvents will then be removed under vacuum to give the benzyl ether protected lignin-PEG intermediate.

The benzyl ether protecting groups will be removed by dissolving the previously obtained material in 25-50 mL of ethanol. A hydrogenation catalyst (ex: 0.05 g of a 10% Pd/C mixture) will be added and the material transferred to a "shaker-type" Parr hydrogenation apparatus (or any other type of thick-walled glass reaction vessel). The material will be hydrogenated at ambient temperature under 30-50 psi of hydrogen gas for 2-4 hours. Afterwards, pressure will be vented and the reaction mixture will be filtered through a small pad of Celite/filter agent to remove catalyst. The solvents will then be removed under vacuum to give the PEG-substituted product 3 in FIG. 6.

Product 3 (1.0 gram) will be dissolved in 25-50 mL of dry pyridine at room temperature under a blanket of inert gas, with stirring. Toluene sulfonyl chloride (0.5 grams, 0.026 mol) will be added portion-wise, with external ice-water cooling as necessary to keep the internal flask temperature between 0 and 25° C. After 4-8 hours of stirring, the flask will be poured into equal volumes of dilute (0.1M) HCl and ethyl acetate. The aqueous layer will be extracted three times with fresh portions of ethyl acetate. The combined organic layers will be dried over anhydrous $MgSO_4$ and filtered through a cotton plug before removing the volatile solvents under vacuum. The resultant crude tosylate will be set aside, temporarily stored under a layer of inert gas, for later use without further purification.

A freshly dried reaction flask equipped with stirring will be filled with 25-50 mL of freshly dried THF under a blanket of inert gas with a mineral oil bubbler as gas outlet. To this will be added uracil (2.91 g, 0.026 mol) followed by stirring until dissolution is complete. Sodium hydride (0.624 g, 0.026 mol) will then be added portion-wise with ice-water cooling to keep the internal flask temperature between 0 and 25° C. Once all the NaH has been added, the flask will be stirred for an additional 20-30 minutes at this lowered temperature (still under inert atmosphere) and then the previously synthesized batch of tosylate intermediate will be added portion-wise (dissolved in 10 mL of dry THF if necessary), maintaining inert atmosphere, over 15-30 minutes. Stirring and temperature control will be continued for another 4-8 hours. The reaction will then be quenched with the addition of 5 mL of saturated ammonium chloride solution. The organic layer will be dried over anhydrous magnesium sulfate, filtered through a cotton plug, and any the volatiles will be removed under vacuum to give the uracil-terminated product 4 in FIG. 6.

The monomer product 4 will be mixed with 0.1 wt % sodium benzoate as a preservative.

The resultant product will be packaged in a UV blocking material, such as metal foil squeeze tubes for smaller quantities (less than about 10 ml), and metal cans for larger quantities (greater than 100 ml). The metal may be aluminum or steel, for example.

EXAMPLE 3

Adhesive Kit

The UV curable adhesive of Example 2 will be packaged together with a UV light source of 320 nm wavelength. Packages may include optional light guides in the form of fiber optic cables for guiding and directing the UV light.

EXAMPLE 4

Use of a UV Curable Adhesive

Syringe needles will be assembled using the adhesive kit of Example 3. A cylindrical metal needle will be inserted into a receptacle tip end of molded plastic syringe caps. The UV curable adhesive of Example 2 will be injected around the needle, between the exterior surface of the needle and an interior surface of receptacle. The combined syringe tip will be passed through a UV light chamber having a 320 nm UV light ring and will be exposed to the UV light for about 30 seconds to cure the adhesive.

EXAMPLE 5

Use of a UV Curable Adhesive

The adhesive of the kit of Example 3 will also be usable for repairing broken household items, such as a broken handle of a ceramic cup, or a cracked plastic cover of a vacuum cleaner. For the cup, the UV curable adhesive will be applied to the ends of the broken segment of the handle, and the broken segment will be replaced in its original position on the cup body. While temporarily holding the handle in position, the UV light will be turned on and the cup will be exposed to the UV light to cure the adhesive. The cup or light will be moved relative to the other to expose all portions of the exposed adhesive to the light. The handle will then be retained in its original position by the cured adhesive which will provide a bond strong enough to retain the handle on the cup even when the cup is filled with liquid.

Similarly, for the cracked plastic cover, the adhesive will be applied to at least one of the edges and the edges will be pressed together. While holding the edges together, the UV light will be turned on and the adhesive will be exposed to the light to cure the adhesive. The cured adhesive will retain the cover portions in relation to one another for the cover to look and function essentially as originally supplied.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An ultraviolet curable adhesive composition comprising;
   components of formula $$R\text{-}(L\text{-}X)_n,$$

wherein:
   n is greater than or equal to 1;
   R comprises a macromolecular polymer selected from the group consisting of cellulose, lignin, hemi-cellulose, chitin, dextran, starch, glycogen, pectin, inulin, and derivatives thereof and combinations thereof;
   X comprises a heterocyclic compound comprising a functional group capable of dimerization with a neighboring X when exposed to ultraviolet light of an intensity sufficient for dimerization of the functional groups; and
   L comprises a linking component for covalently bonding X to R.

2. The adhesive of claim 1, wherein the functional group comprises at least one —C═C—.

3. The adhesive of claim 2, wherein X comprises at least one of a diazine, diazine derivatives, and combinations thereof.

4. The adhesive of claim 2, wherein X comprises at least one of pyridine, pyrazine, pyrimidine, pyridazine, and derivatives thereof and combinations thereof.

5. The adhesive of claim 1, wherein X comprises at least one of thymine, uracil, cytosine, and derivatives thereof and combinations thereof.

6. The adhesive of claim 1, wherein the adhesive has a fluidity prior to curing and a pliability after curing, the substantially linear molecular constituent has a length, and the length provides:
a correlated degree of fluidity to the pre-cured adhesive with longer length providing decreased fluidity; and
a correlated degree of pliability to the cured adhesive with longer length providing increased pliability.

7. An ultraviolet curable adhesive composition comprising components of formula $$R\text{-}(L\text{-}X)_n,$$

wherein:
n is greater than or equal to 1;
R comprises a macromolecular polymer;
X comprises a heterocyclic compound comprising a functional group capable of dimerization with a neighboring X when exposed to ultraviolet light of an intensity sufficient for dimerization of the functional groups; and
L is a linking component for covalently bonding X to R, and L comprises at least one of substituted or unsubstituted linear alkenyls, and substituted or unsubstituted linear polyethers.

8. The adhesive of claim 7, wherein L comprises at least one of polyoxymethylene, polyoxyethylene, polyoxypropylene, polytetrahydrofuran, and derivatives thereof and combinations thereof.

9. The adhesive of claim 8, wherein:
X comprises at least one of thymine, uracil, cytosine, and derivatives thereof and combinations thereof;
R comprises at least one of cellulose, hemicellulose, lignin, and derivatives thereof and combinations thereof; and
L comprises —$[CH_2CH_2O]_m$— wherein m≥1.

10. The adhesive of claim 7, wherein:
the adhesive has a fluidity and a pliability; and
each L comprises at least one of —$[CH_2O]_m$—, —$[CH_2CH_2O]_m$—, —$[CH_2CH_2CH_2O]_m$—, and —$[CH_2CH_2CH_2CH_2O]_m$—, and combinations thereof, wherein m≥1, and increasing m correlates to decreased fluidity and increased pliability.

11. The adhesive of claim 7, wherein L comprises —$[CH_2CH_2O]_m$— wherein m is greater than or equal to 1 and less than or equal to about 50.

12. The adhesive of claim 1, further comprising a preservative mixed with the components of formula $R\text{-}(L\text{-}X)_n$, wherein the preservative comprises at least one of sodium benzoate and potassium benzoate, and the adhesive comprises about 0.1 wt % of the preservative.

13. An ultraviolet curable adhesive composition comprising components of formula $$R\text{-}(L\text{-}X)_n,$$

wherein:
n is greater than or equal to 1;
R comprises at least one of cellulose, hemicellulose, lignin, and derivatives thereof and combinations thereof;
L is a linking component for covalently bonding X to R and comprises —O—C(O)O—$(CH_2CH_2O)_m$—$CH_2CH_2$—, wherein m≥1; and
X comprises at least one of thymine, uracil, cytosine, and derivatives thereof and combinations thereof.

14. The adhesive of claim 13, wherein the components of formula $R\text{-}(L\text{-}X)_n$ are

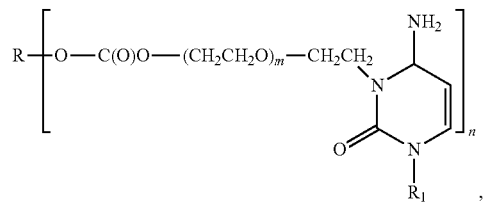

wherein:
m≥1; and
$R_1$ comprises trifluoromethyl, nitro, cyano, $C_1$-$C_{20}$ alkyl, aryl, F, Cl, Br, I, $C_1$-$C_{20}$ alkyl ether, $C_1$-$C_{20}$ alkyl ester, benzyl halide, benzyl ether, aryl ether, hydroxyl, alkoxyl, amino, alkylamino, and dialkylamino.

15. The adhesive of claim 13, wherein the components of formula $R\text{-}(L\text{-}X)_n$ are

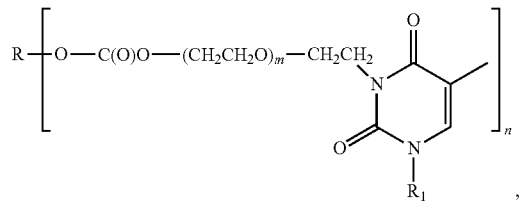

wherein:
m≥1; and
$R_1$ comprises trifluoromethyl, nitro, cyano, $C_1$-$C_{20}$ alkyl, aryl, F, Cl, Br, I, $C_1$-$C_{20}$ alkyl ether, $C_1$-$C_{20}$ alkyl ester, benzyl halide, benzyl ether, aryl ether, hydroxyl, alkoxyl, amino, alkylamino, and dialkylamino.

16. The adhesive of claim 13, wherein the components of formula $R\text{-}(L\text{-}X)_n$ are

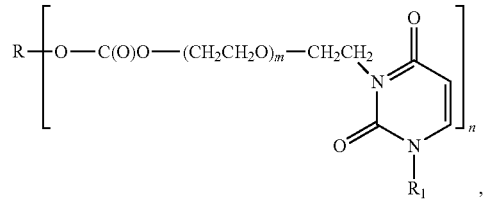

wherein:
m≥1; and
$R_1$ comprises trifluoromethyl, nitro, cyano, $C_1$-$C_{20}$ alkyl, aryl, F, Cl, Br, I, $C_1$-$C_{20}$ alkyl ether, $C_1$-$C_{20}$ alkyl ester, benzyl halide, benzyl ether, aryl ether, hydroxyl, alkoxyl, amino, alkylamino, and dialkylamino.

17. The adhesive of claim 13, wherein the components of formula $R\text{-}(L\text{-}X)_n$ are

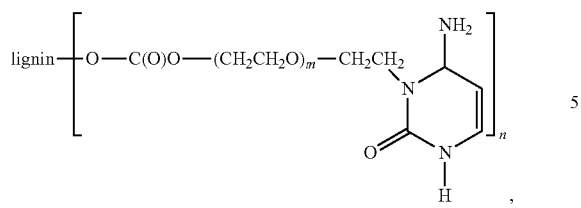
wherein m ≥ 1.

UNITED STATES PATENT AND TRADEMARK OFFICE
CERTIFICATE OF CORRECTION

| | | |
|---|---|---|
| PATENT NO. | : 9,120,958 B2 | Page 1 of 1 |
| APPLICATION NO. | : 13/816988 | |
| DATED | : September 1, 2015 | |
| INVENTOR(S) | : Brizius | |

It is certified that error appears in the above-identified patent and that said Letters Patent is hereby corrected as shown below:

On the Title Page, insert Figure -- 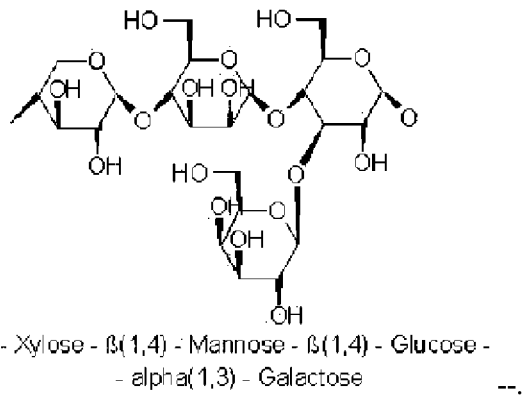 --.

In the Specification

In Column 1, Line 6, delete "§371" and insert -- § 371 --, therefor.

Signed and Sealed this
Nineteenth Day of July, 2016

Michelle K. Lee
*Director of the United States Patent and Trademark Office*